UNITED STATES PATENT OFFICE.

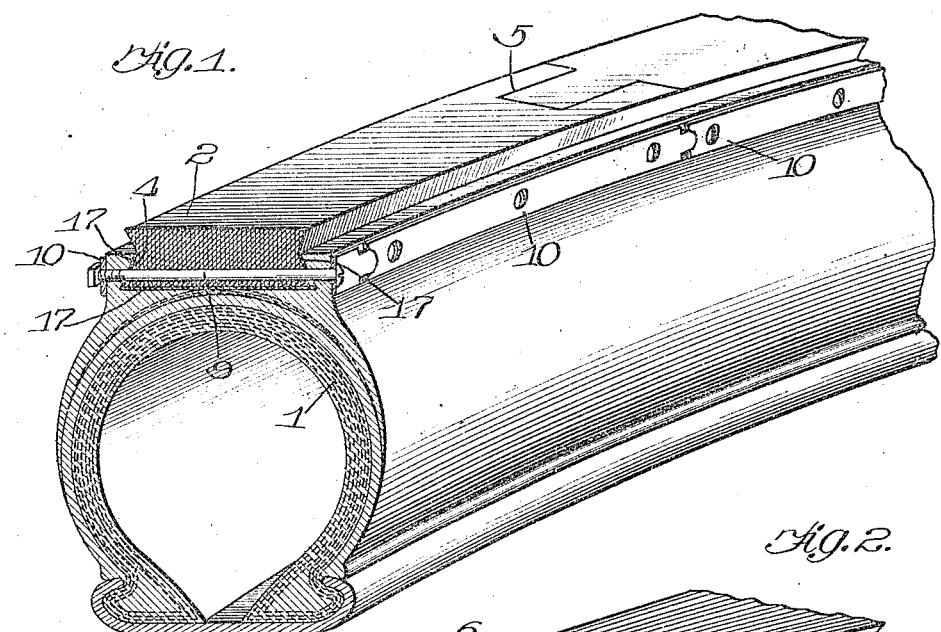
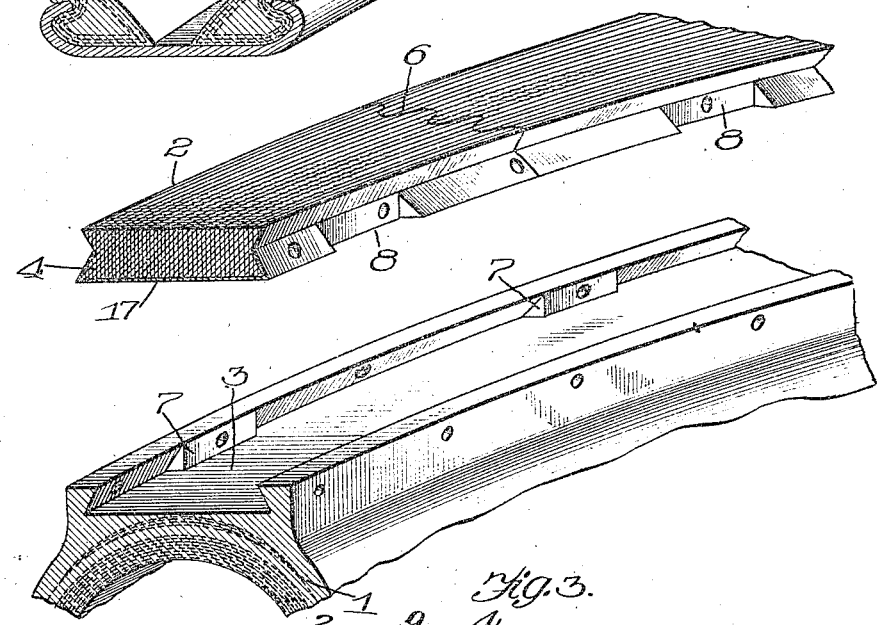
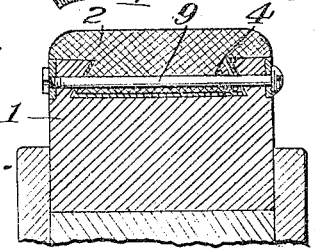

ALFRED FRESCHL, OF CHICAGO, ILLINOIS.

TIRE.

1,013,596.  Specification of Letters Patent.  Patented Jan. 2, 1912.

Application filed July 3, 1908. Serial No. 442,522.

*To all whom it may concern:*

Be it known that I, ALFRED FRESCHL, a citizen of the United States, residing at Chicago, in the county of Cook and State of Illinois, have invented certain new and useful Improvements in Tires, of which the following is a description.

My invention belongs to that class of devices known as tires, whether pneumatic, cushion or the like, in which the body of the tire or tire proper is provided with a substantially detachable tread which is locked on the tire.

My invention has for its objects the production of a simple, convenient and more satisfactory tire of the kind described, in which the life of the tire is lengthened and the same less easily punctured. The preferred construction is also adapted to take a firm grip on the ground and reduce the sliding and skidding of the vehicle. The tread although normally substantially continuous and securely fastened or locked on the tire, may be readily and easily detached and removed and replaced by a new tread if desired.

To this end my invention consists in the novel construction, arrangement, and combination of parts herein shown and described and more particularly pointed out in the claims.

In the drawings, wherein like reference characters indicate like or corresponding parts, Figure 1 is a perspective view of a portion of a pneumatic tire embodying my construction, Fig. 2 is a perspective view of a portion of the tread thereof removed from the tire, Fig. 3 is a perspective view of a portion of the tire with the tread removed. Fig. 4 is a sectional view of my construction as embodied in a solid or cushion tire.

Referring to the drawings, the construction, as illustrated, comprises a tire 1 which for the purpose of distinction I shall term the body part, of any suitable type whether single or double tube, or of any suitable material, and applicable to any form of rim, and a detachable tread therefor. The tread 2 is made of any suitable or desired material, preferably of fabric with rubber or other suitable material formed therewith. The fabric may be cut on the bias if desired and is preferably arranged in vertical layers circumferentially around the tire. The tread 2 is secured to the body 1 of the tire in the preferred construction, by means of an extension on one part coöperating with a recess on the other part. As shown the body part 1 is provided with a dove-tailed recess 3 and the tread with the coöperating extension 4 adapted to be positioned therein, so that the extension 4 and recess 3 in themselves lock the tread to the tire. As stated when the tire is inflated the tread is substantially locked in the recess, it being a comparatively easy matter to insert the tread 2 when the tire is deflated. If desired, the tread 2 may be placed on the market in rolls or on reels so that when it is desired to fit a new tread to a tire, the required amount of tread may be cut from the roll and positioned on the body part, the two ends of the tread being preferably serrated as shown at 5 in Fig. 1, or at 6 in Fig. 2. The ends when so brought together and whether serrated as shown or in any other way, may be vulcanized or cemented together forming a substantially continuous tread.

Any suitable means may be employed to prevent the tread from creeping on the tire, that is to prevent circumferential movement of one relative to the other. As shown the tire 1 is provided with beads 7 within the dove-tailed recess 3 adopted to coöperate with corresponding recesses 8 on the tread. It is obvious that any other equivalent means may be employed for the purpose. There may be any number of beads 7 and when the tread is placed on the market in rolls the recesses 8 may be cut in the tread to correspond with the beads 7 at the time that the same is fitted or positioned on the tire. As shown in Fig. 1 a plurality of bolts 9 are arranged passing transversely through the tire and tread, which in themselves prevent creeping of the tread on the tire. As shown in this figure a plurality of strips or plates 10 are arranged on each side of the tire serving as washers for the bolts 9. The plates 10 may be countersunk in the tire if desired, and while shown in a plurality of pieces and substantially hinged together any other suitable arrangement may be employed.

As is obvious when the tread is worn it may be detached and replaced by a new tread if desired, the preferred construction giving a substantially punctureproof tire.

It might be mentioned that the tread when made up of fabric as described, may be cut to the shapes shown or pressed into those shapes as preferred.

In the form shown in Fig. 4, the tire or body part 1 is made solid and preferably of rubber or other equivalent cushioning material. The tread 2 may be secured to the body part in various ways. As shown in this figure, the body part is recessed and the tread provided with the extension coöperating therewith.

As before stated I wish it to be understood that my tread is applicable to the forms of tires shown or their equivalents and that if desired the tread may be provided with a coat or surface of suitable material 17 substantially as shown in Fig. 1, preferably a material that would facilitate cementing or otherwise additionally fastening the tread to the body part should that be desired, the cementing to a large extent preventing moisture from penetrating between the tire and tread.

Having thus described my invention it is obvious that various immaterial modifications may be made in the form, construction, arrangement and combination of parts shown and described without departing from the spirit of my invention, hence I do not wish to be understood as limiting myself to the exact form, arrangement or combination of parts shown and described.

What I claim and desire to secure by Letters Patent is:

1. A tire comprising a body part and a detachable tread, the body part of the tire being yieldable and having upwardly extending overhanging side flanges, the tread member comprising a plurality of vertically extending relatively thin layers of yieldable material, the tread having a circumferentially extending cut out portion in each side whereby to form a projecting tongue to engage under the overhanging flange of the body part, and whereby to provide an oppositely extending tongue which overlies the upper surface of said flange, and rods extending through the respective flanges of the body part, and through the various layers of the tread part, and means for adjusting said rods lengthwise whereby to bindingly engage the flanges of the body part with the tread part and to compress the layers of said tread part.

2. A tire comprising a body part and a detachable tread, the body part of the tire being yieldable and having upwardly extending overhanging side flanges, and the tread member comprising yieldable material, the tread having a circumferentially extending cutout portion in each side whereby to form a projecting tongue to engage under the overhanging flange of the body part, and whereby to provide an oppositely extending tongue which overlies the upper surface of said flange, rods extending through the respective flanges of the body part, and through the tread part, the projecting flanges of the body part having at spaced points thereabout integral inwardly projecting parts, and the yieldable tread having coöperating recessed parts to be engaged by said integral projections on the flanges of the body part, substantially as shown and described.

3. A tire comprising a body part and a detachable tread, the body part of the tire being yieldable and having upwardly extending overhanging side flanges, the tread member comprising a plurality of relatively thin vertically extending layers of yieldable material, the tread having a circumferentially extending cutout portion in each side whereby to form a projecting tongue to engage under the overhanging flange of the body part, and whereby to provide an oppositely extending tongue which overlies the upper surface of said flange, rods extending through the respective flanges of the body part, and through the tread part, means for adjusting said rods lengthwise whereby to bindingly engage the flanges of the body part with the tread part and to compress the layers of said tread part, and circumferential plates or collars overlying the outer surfaces of the flanges of the body part and beneath the ends of the securing rods, said collars being formed of abutting sections having a pivotal engagement one with the other.

In testimony whereof, I have hereunto signed my name in the presence of two subscribed witnesses.

ALFRED FRESCHL.

Witnesses:
 Roy W. Hill,
 Charles I. Cobb.